United States Patent [19]
Morikawa

[11] Patent Number: 5,241,933
[45] Date of Patent: Sep. 7, 1993

[54] ABNORMALITY WARNING SYSTEM FOR A DIRECT FUEL INJECTION ENGINE

[75] Inventor: Koji Morikawa, Tokyo, Japan

[73] Assignee: Fuji Jukogyo Kabushiki Kaisha, Tokyo, Japan

[21] Appl. No.: 9,744

[22] Filed: Jan. 27, 1993

[30] Foreign Application Priority Data

Feb. 28, 1992 [JP] Japan ............... 4-18969[U]

[51] Int. Cl.$^5$ ................ F02B 77/00; F02M 41/00
[52] U.S. Cl. ................... 123/198 D; 123/458
[58] Field of Search .......... 123/198 D, 458, 497, 123/456, 479, 359, 506

[56] References Cited

U.S. PATENT DOCUMENTS

| | | | |
|---|---|---|---|
| 3,911,884 | 10/1975 | Moriya | 123/458 |
| 4,167,169 | 9/1979 | White | 123/458 |
| 4,683,854 | 8/1987 | Goulet | 123/198 D |
| 4,862,849 | 9/1989 | Wilson | 123/456 |
| 5,058,547 | 10/1991 | Morikawa | 123/198 D |
| 5,085,193 | 2/1992 | Morikawa | 123/497 |
| 5,094,267 | 3/1992 | Ironside | 123/198 D |
| 5,146,892 | 9/1992 | Krampe | 123/198 D |
| 5,186,138 | 2/1993 | Hashimoto | 123/456 |

FOREIGN PATENT DOCUMENTS

| | | | |
|---|---|---|---|
| 0122733 | 7/1984 | Japan | 123/458 |
| 0190444 | 10/1984 | Japan | 123/458 |
| 0211727 | 11/1984 | Japan | 123/458 |

*Primary Examiner*—Carl S. Miller
*Attorney, Agent, or Firm*—Beveridge, DeGrandi, Weilacher & Young

[57] ABSTRACT

In a fuel control system which has both high pressure fuel system and ordinary fuel control system operated in accordance with the operating conditions of the engine, highly pressurized fuel is regulated by a high pressure regulator in a high pressure fuel injection system for operating a direct fuel injection engine, and an abnormality deciding control system judges abnormality of the high pressure pump. The abnormality is indicated if the abnormality occurs. Thus, the driver can know the abnormality at an early stage and avoid various troubles.

3 Claims, 5 Drawing Sheets

ABNORMALITY WARNING SYSTEM FOR A DIRECT FUEL INJECTION ENGINE

BACKGROUND OF THE INVENTION

The present invention relates to an abnormality warning system of a high pressure pump for a direct fuel injection system in a two-cycle or four-cycle direct fuel injection engine.

As an internal combustion engine for a vehicle, a high pressure fuel injection system in which a high pressure one-fluid type injector is mounted in a combustion engine, electrically opened and closed and fuel is injected at a high pressure directly in a cylinder, has been already proposed. In this high pressure fuel injection system, fuel is discharged at a high pressure by a high pressure pump, and the fuel pressure is controlled by operating a high pressure regulator in accordance with an electric signal from a control unit. Thus, if the high pressure pump is abnormal or age-changed, the high pressure pump is controlled to be fed back so as to coincide with the fuel pressure even by largely altering the electric signal with respect to a desired fuel pressure at an initial stage. In this respect, the engine is operated without problem. However, if control of the electric signal becomes impossible so that the fuel pressure becomes insufficient and an output is actually decreased, a driver has initially felt an abnormality. If the abnormality of the high pressure pump is advanced to this state, damage of the pump is increased, the vehicle becomes impossible to travel, or damage of the engine is increased. Hence a repairing cost is remarkably increased. Consequently, it is desired to always monitor the operating state of the high pressure pump to warn at an early stage for repairing if an abnormality occurs.

Heretofore, with regard to the fore-described conventional fuel injection system, Japanese Patent Application Laid-Open 63-38639 discloses, for example, a fuel injection system where a piezoelectric actuator is driven operatively with a fuel pump at the time of starting, and a starter is driven after a fuel pressure reaches a predetermined value. Further, Japanese Patent Application Laid-Open 62-129541 discloses a fuel injection system where, if a fuel pressure is decreased to a predetermined value or less at the time of starting, an operation of a fuel injection valve is stopped.

In the former prior art, its starting characteristic is improved, and in the latter prior art, exhaust gas at the time of starting and fuel consumption are improved. However, in both the prior arts, an abnormality of the high pressure pump cannot be indicated by warning.

SUMMARY OF THE INVENTION

An object of the present invention is to provide an abnormality warning system of a high pressure fuel injection type for a direct fuel injection engine for injecting fuel of a high fuel pressure by a high pressure pump directly in a cylinder where an abnormality of the high pressure pump is detected and warned at an early stage to prevent impossibility of traveling or repairing.

In order to achieve the afore-described object according to the present invention, there is provided an abnormality warning system for a direct fuel injection engine having, a cylinder, a fuel injector mounted on said cylinder for injecting a fuel, a fuel feeder pump for supplying said fuel from a fuel tank to said injector via a fuel passage, a common rail provided between said fuel feeder pump and said fuel injector for distributing said fuel to said cylinder, a high pressure pump connected between said fuel feeder pump and said common rail for pressurizing said fuel, a high pressure regulator connected between said common rail and said fuel tank, an accelerator pedal sensor for detecting an opening degree of an accelerator pedal and for producing an accelerator signal, an engine speed sensor for sensing an engine speed and for generating an engine speed signal, a fuel pressure sensor mounted on said common rail for detecting a fuel pressure and for producing a pressure signal, and a control unit responsive to said accelerator, engine speed and pressure signals for controlling said fuel pressure, an improvement of the system which comprises desired fuel pressure setting means responsive to said accelerator and engine speed signals for calculating a desired fuel pressure and for generating a desired fuel pressure signal, correcting means responsive to said pressure and desired fuel pressure signal for correcting an amount of said fuel to be injected and for producing a correcting current signal, current control means responsive to said desired fuel pressure signal and said correcting current signal for calculating a current to control said high pressure regulator, abnormality warning means responsive to said engine speed signal, said desired pressure signal and said correcting current signal for judging an abnormality of said high pressure pump due to correcting conditions of said fuel pressure signal and for producing an abnormality signal, and display means responsive to said abnormality signal for indicating a warning so as to prevent said direct fuel injection engine from damaging while operating.

According to the abnormality warning system constructed as described above, fuel of a high pressure is produced by the high pressure pump of the high pressure fuel injection system at the time of operating the engine, the high pressure regulator is operated by the fuel pressure signal of the fuel pressure control system at this time, the fuel pressure of the fuel of the high pressure pump is controlled to be fed back to coincide with the desired fuel pressure, and the fuel is injected directed in the cylinder by the injector. In this case, the abnormality deciding control system always accurately judges presence or absence of an abnormality of the high pressure pump from the correcting state of the fuel pressure signal, indicates the abnormality by the abnormality indicating means if the abnormality occurs. Thus, the driver can know the abnormality at an early stage and avoid various troubles.

These and other objects and features of the present invention will become understood from the following description with reference to the accompanying drawings.

DETAILED DESCRIPTION OF THE PREFERRED EMBODIMENTS

Figure 6:
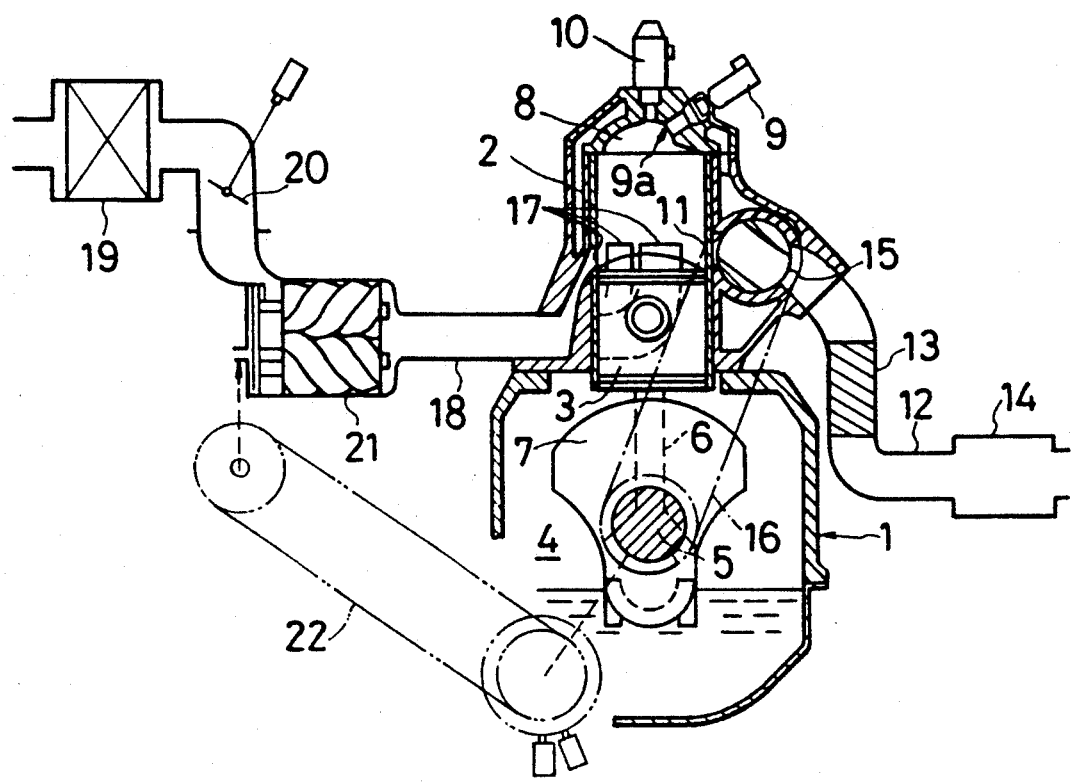
FIG. 6 is a sectional view showing a two-cycle high pressure fuel injection system in which the present invention is applied.

The embodiments of the present invention will be explained referring to the drawings. FIG. 6 shows an entire arrangement of a two-cycle direct fuel injection engine to which the present invention is applied. Numeral 1 indicates a body of a two-cycle internal combustion engine. A piston 3 reciprocates in a cylinder 2. The piston 3 is connected to a crankshaft 5 by a connecting rod 6 in a crankcase 4. A counterweight 7 is mounted on the crankshaft 5 so as to cancel reciprocating inertia of the piston 3. A combustion chamber 8 has an offset, wedge, or hemispheric shape. A high pressure one-fluid type fuel injector 10 is mounted at a high position near the top of the center of the combustion chamber 8 so as to inject high pressure fuel in the cylinder 2 according to a pulse signal. A spark plug 9 is so inclined as to position an electrode 9a directly under the injecting direction of the injector 10.

The distance between the injector 10 and the electrode 9a is determined based on injected fuel having a shape of a cone, which is injected immediately before the ignition in low and middle engine load ranges. That is to say, if the distance is short, the fuel is insufficiently atomized. To the contrary, if the distance is long, the fuel spray is dispersed. Accordingly, it becomes possible to provide a stratified charge wherein the fuel spray is ignited at a rear portion of the spray. Moreover, since the injector 10 is positioned substantially on the center line of the cylinder 2, a large quantity of fuel, which is injected at earlier timing in a heavy engine load range, is quickly diffused from the center to the entirety in the cylinder 2 to homogeneously premix air and fuel to achieve a homogeneous combustion of air-fuel mixture.

In a wall of the cylinder 2, an exhaust port 11 is opened to be opened and closed at a predetermined timing by the piston 3. A catalytic unit 13 and a muffler 14 are provided from the exhaust port 11 in an exhaust pipe 12. A rotary exhaust valve 15 is mounted in the exhaust port 11, operatively connected to the crankshaft 5 by belt means 16 to open or close the exhaust port 11. Namely, when the piston 3 starts rising from a bottom dead center, the exhaust port 11 is closed by the rotary exhaust valve 15 at an early stage to reduce blowing of the air. At the same time, it is possible to advance the fuel injection timing in a homogeneous combustion type of the heavy engine load range.

Further, in the wall of the cylinder 2, scavenge ports 17 to be opened and closed at a predetermined timing with respect to the position of the piston 3 are similarly opened, at positions being spaced from each other about 180 to 90 degrees in a circumferential direction to the exhaust port 11. An air cleaner 19 and a throttle valve 20 to be opened in response to an opening of an accelerator pedal are provided in an intake pipe 18 of the scavenge port 17. A scavenge pump 21 is operatively connected to the crankshaft 5 by belt means 22 downstream of the throttle valve 20 so as to be always driven by the power of the engine for producing a scavenge pressure. In this case, the throttle valve 20 is slightly opened even when an accelerator pedal is fully closed, thus allowing the scavenge pump 21 to induce air. If the accelerator pedal is depressed over the range of full closure, the throttle valve 20 is opened in response to the opening of the accelerator pedal to control the quantity of air. Then, the cylinder 2 is forcibly scavenged by the scavenge pressure of the air, and air is supplied to the cylinder 2 with high charging efficiency.

Figure 5:
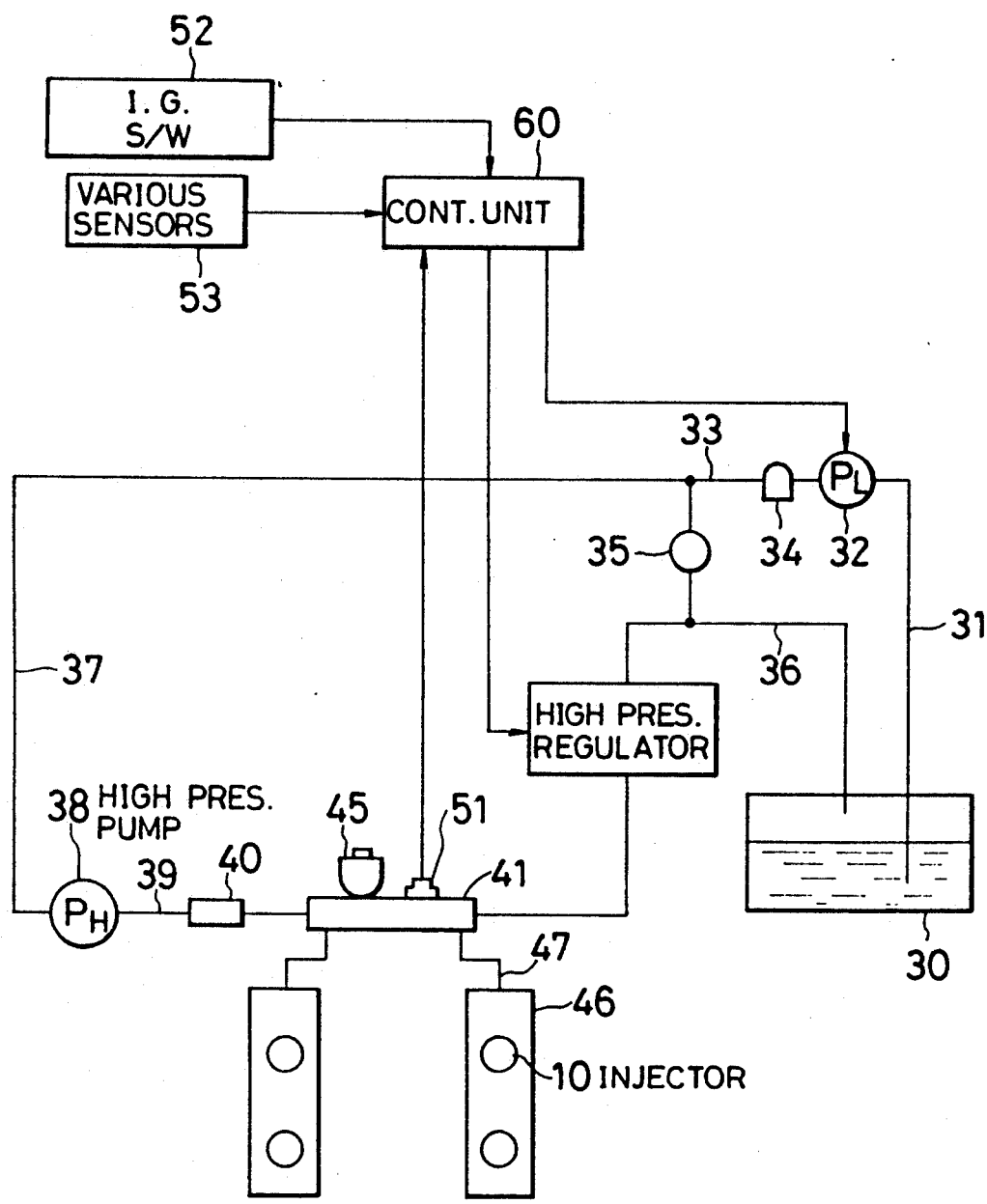
FIG. 5 is a circuit diagram showing a high pressure fuel injection system for the direct fuel injection engine of the embodiment.

Referring to FIG. 5, showing a circuit diagram of a high pressure fuel injection system of a direct fuel injection engine, a high pressure fuel injection system will be described. In a high pressure fuel injection system 50, a fuel passage 31 from a fuel tank 30 is connected to a fuel feeder pump 32. A fuel passage 33 of a discharge side of the fuel feeder pump 32 is connected to a low pressure regulator 35 through a low pressure filter 34. A return passage 36 from the low pressure regulator 35 is connected to the fuel tank 30 to produce a predetermined low pressure fuel. A passage 37 of low pressure fuel from the low pressure regulator 35 is connected to a high pressure pump 38. A fuel passage 39 of a discharge side of the high pressure pump 38 is connected to a common rail 41 having a predetermined capacity through a high pressure filter 40. A high pressure regulator 43 is provided in a return passage 42 of the common rail 41 to regulate fuel to a predetermined fuel pressure. A change of the fuel pressure is reduced by an accumulator 45, and a high pressure fuel is stably produced. The common rail 41 is so connected to the injector 10 of a bank rail 46 as to supply the high pressure fuel to the injector 10 through a fuel passage 47.

Referring also to FIG. 5, a control circuit of the high pressure fuel injection system 50 will be described. A fuel pressure sensor 51 for detecting an actual fuel pressure is mounted on the common rail 41. An ignition switch 52 and various sensors 53 are provided. Signals from the ignition switch 52 and the various sensors 53 are input to a control unit 60, and processed by the control unit 60. Namely, when the control unit 60 judges starting of the engine in dependency on the signal of the ignition switch 52, the control unit 60 outputs a drive signal to the fuel feeder pump 32, and outputs a fuel pressure signal to the high pressure regulator 43 during the operation of the engine. The control unit 60 calculates a fuel injection amount and an injection timing responsive to the respective operating states, outputs injection signals thereof to the injectors 10 of the respective cylinders to decide ignition timings of the respective injectors 10, and outputs the corresponding ignition signals to the respective spark plugs 9.

Figure 1:
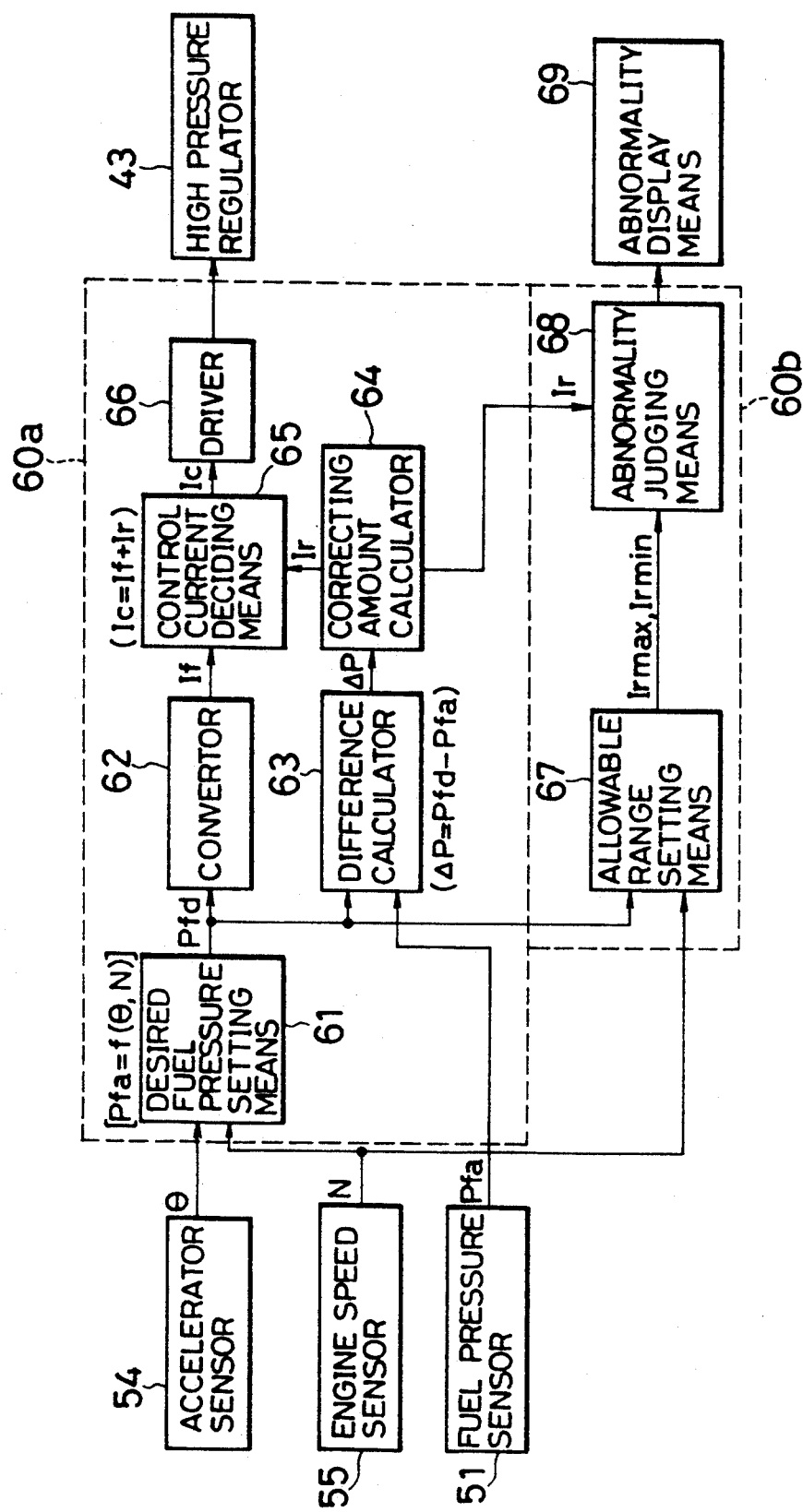
FIG. 1 is a block diagram showing an embodiment of an abnormality warning system for a direct fuel injection engine according to the present invention.

Referring to FIG. 1, which is a block diagram of an embodiment of an abnormality warning system for a direct fuel injection engine according to the present invention, a fuel pressure control system of the control unit 60 and a pump abnormality warning control system will be described. First, a fuel pressure control section 60a will be described. An accelerator pedal sensor 54 for detecting an opening degree of an accelerator pedal and for producing an accelerator signal, and an engine speed sensor 55 for sensing an engine speed are provided. A desired fuel pressure setting means 61 inputs signals from the accelerator pedal sensor 54 and the engine speed sensor 55, and sets a desired fuel pressure Pfd responsive to the respective operating states in dependency on an opening $\theta$ of the accelerator pedal and the engine speed N by referring to a map. The desired fuel pressure Pfd and the engine speed N are input to a current converter 62, which converts it to a current If corresponding to the desired fuel pressure Pfd. The desired fuel pressure Pfd and the actual fuel pressure Pfa of the fuel pressure sensor 51 are input to a difference calculator 63, which calculates a differential pressure ΔP between both the fuel pressures Pfd and Pfa in dependency on $$\Delta P = Pfd - Pfa$$

The difference ΔP is input to correcting amount calculator 64, which decides a correcting current Ir of a correcting amount corresponding to the difference ΔP. The current If and the correcting current Ir are input to a control current deciding means 65, which calculates a control current Ic in dependency on $$Ic = If + Ir$$

This control current Ic is supplied to the high pressure regulator 43 through a driver 66.

Then, a pump abnormality warning control system 60b will be described. In the pump abnormality warning control system 60b, an allowable range setting means 67 inputs the desired fuel pressure Pfd and the engine speed N, and sets an upper limit value Irmax and a lower limit value Irmin of an allowable correction range for the desired fuel pressure Pfd and the engine speed N by referring to the map. The upper and lower limit values Irmax and Irmin, and the correcting current Ir of the afore-described fuel pressure control system are input to an abnormality judging means 68. The abnormality judging means 68 compares the correcting current Ir with the allowable range in dependency on the upper limit value Irmax and the lower limit value Irmin, judges the correcting state, and judges the state normal in case where the correcting current Ir falls within the allowable range, whereas judges the high pressure pump 38 abnormal in case where the correcting current Ir exceeds the allowable range and hence outputs an abnormality signal to an abnormality display means 59.

Then, the operation of the embodiment will be described. When the two-cycle engine is operated, the throttle valve 20 is opened in dependency on the opening degree of the accelerator pedal, air is induced to the scavenge pump 21 to produce a predetermined scavenge pressure. When the piston 3 falls in the cylinder 2, the exhaust port 11 is opened. When the scavenge port 17 is then opened, pressurized air is induced from the scavenge port 17 into the cylinder 2. The remaining gas of the cylinder 2 is discharged from the exhaust port 11 by the vertical swirling flow of the intake air, and the cylinder 2 is scavenged so as to fill the cylinder 2 with the intake air in high charging efficiency. On the other hand, when the piston 3 starts rising from a bottom dead center, the rotary exhaust valve 15 is closed to finish the scavenging of the cylinder 2. Thus, fuel can be injected without blowing of fuel, the scavenge port 17 is then closed, and the engine is shifted to a compression stroke.

At this time, the fuel feeder pump 32 and the high pressure pump 38 of the high pressure fuel injection system 50 are driven. Fuel of the fuel tank 30 is induced by the feeder pump 32, regulated to a predetermined low pressure by the low pressure regulator 35, and then fed to the high pressure pump 38. In this manner, a predetermined fuel is always smoothly supplied to the high pressure pump 38. Fuel of high pressure discharged from the high pressure pump 38 is fed to the common rail 41, and then regulated at its fuel pressure by the high pressure regulator 43. Thus, fuel of a predetermined quantity is always stored at a constant high fuel pressure. The fuel of the common rail 41 is further fed to the accumulator 45, and a variation in the fuel pressure due to various causes is absorbed to be smoothed. When an injection signal is output from the control unit 60 to the injector 10 of the respective cylinder 2 at the afore-described compression stroke, the smoothed high pressure fuel of the common rail 41 is directly injected into the cylinder 2 in the quantity responsive to an injection pulse width, ignited by the spark plug 9, and burned in a stratified layer or homogeneously.

Further, in the fuel pressure control system 60a of the control unit 60 when the engine is operated as described above, the desired fuel pressure Pfd responsive to the operating state is set by the desired fuel pressure setting means 61, and converted by the current converter 62 to the current If corresponding to the desired fuel pressure Pfd. Then, the differential pressure ΔP between the desired fuel pressure Pfd and the actual fuel pressure Pfa sensed by the fuel pressure sensor 51 is calculated by the difference calculator 63, the correcting current Ir corresponding to the difference ΔP is calculated by the correcting amount calculator 64. Then, the control current Ic decided by the control current deciding means 65 from the current If and the correcting current Ir is fed to the high pressure regulator 43, and the fuel pressure is then regulated by the high pressure regulator 43. In this manner, the actual fuel pressure Pfa is always controlled to be fed back to coincide with the desired fuel pressure Pfd.

Figure 2:
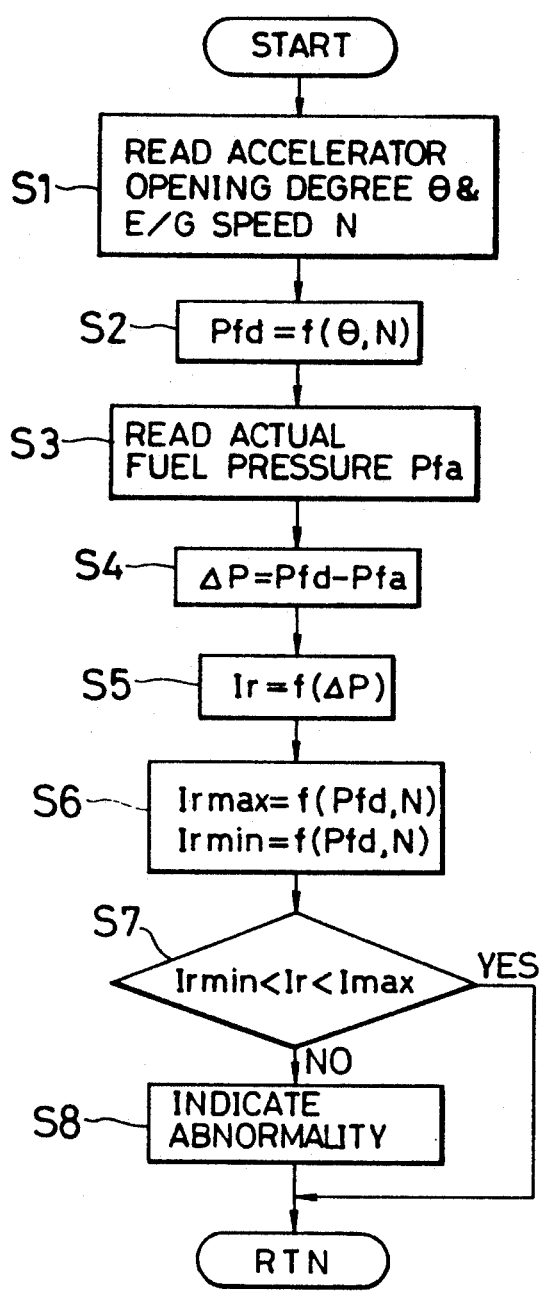
FIG. 2 is a flowchart showing an operation of warning an abnormality of the embodiment.

On the other hand, when the fuel pressure is controlled as described above, the pump abnormality warning control system 60b is operated at the same time. This operation will be described by referring to a flowchart of FIG. 2, showing an operation of an abnormality warning. In a step S1, an accelerator opening degree θ and an engine speed N are read, similarly to the afore-described fuel pressure control. In a step S2, a desired fuel pressure Pfd responsive to the operating state in accordance with the accelerator pedal opening degree θ and the engine speed N is set. In a step S3, actual fuel pressure Pfa is read. In a step S4, a differential pressure ΔP between the desired fuel pressure Pfd and the actual fuel pressure Pfa is calculated. Then, in a step S5, a correcting current Ir corresponding to the difference ΔP is decided. Thereafter, the operation is advanced to a step S6, the upper limit value Irmax and the lower limit value Irmin of the allowable correcting range for the desired fuel pressure Pfd are set. In step S7, the correcting current Ir is compared with the upper limit value Irmax and the lower limit value Irmin.

Figure 3:
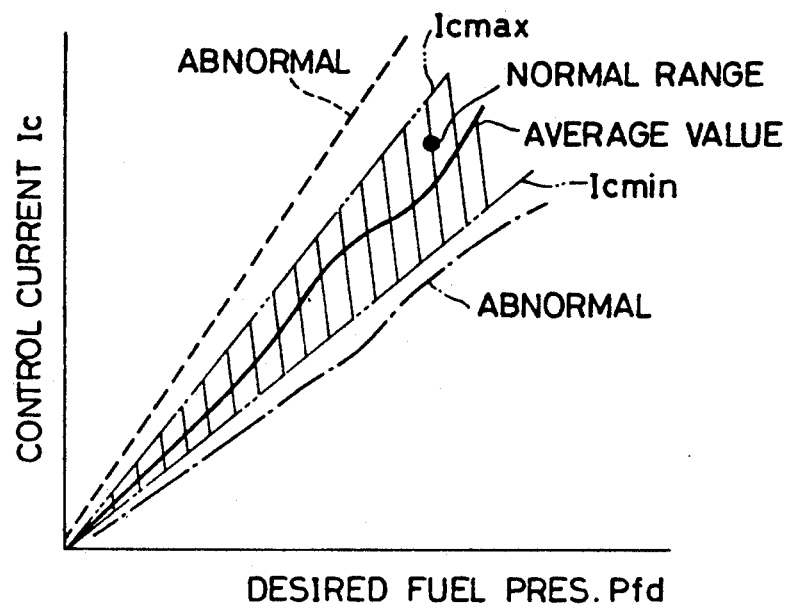
FIG. 3 is a view showing a state of a correcting current in terms of normal and abnormal times.
Figure 4:
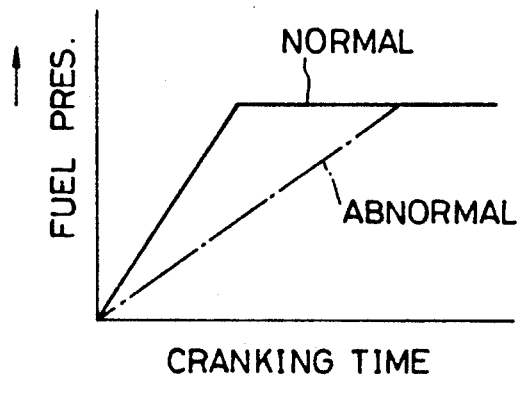
FIG. 4 is a view showing a map to be used for another embodiment of deciding an abnormality.

Then, if the afore-described fuel pressure control in the high pressure pump 38 is normal, the actual fuel pressure Pfa is normally varied, so that the correcting current Ir always falls within the allowable range. Thus, in the step S7, the operation is judged to be normal, and returned to the normal operation. On the other hand, if the high pressure pump 38 is defective or a discharge pressure is abnormally lowered due to an aging change, the actual fuel pressure Pfa is hence lowered. Thus, in the afore-described fuel control system 60a, a control current Ic, for example, exceeds an upper limit value Icmax indicated by a broken line in FIG. 3. In this case, the high pressure pump 38 is controlled to be fed back so as to increase the actual fuel pressure Pfa. On the contrary, if the actual fuel pressure Pfa tends to increase due to a certain abnormality, the control current Ic becomes smaller than a lower limit value Icmin as indicated by a one-dotted broken line of FIG. 3. Thus, the actual fuel pressure Pfa is so controlled as to be decreased. In such a case, in the step S7, an abnormality is judged, and then advanced to a step S8. In the step S8, an abnormality is indicated to be warned. Thus, a driver can grasp the abnormal state at an early stage, and can cope with it by repairing.

Another embodiment of the present invention will now be described. A rising state of an actual fuel pressure at the time of cranking is detected to judge presence or absence of an abnormality of a high pressure pump 38. In this case, in an abnormality warning control system 60b, the actual fuel pressure Pfa is detected at the time of cranking. If the degree of rising of the actual fuel pressure Pfa is smaller as indicated by a one-dotted broken line with respect to the normal case as indicated by a solid line in FIG. 5, an abnormality is judged to indicate warning of the abnormality, thereby providing the similar effect to that of the first embodiment.

While the presently preferred embodiments of the present invention has been shown and described, it is to be understood that these disclosures are for the purpose of illustration and that various changes and modifications may be made without departing from the scope of the invention as set forth in the appended claims. For example, a control value of judging the abnormality may be a voltage.

According to the present invention as described above, presence or absence of the abnormality of the high pressure pump is always judged in the high pressure fuel junction system having the high pressure pump of the direct fuel injection engine, and the abnormality is indicated if the high pressure pump is abnormal. Thus, the driver can grasp the abnormal state before the vehicle reaches impossibility of traveling or repairing. Therefore, the vehicle does not abruptly become impossible to travel, but is lightly damaged, so that the abnormal pump may be easily repaired or replaced. Since the presence or absence of the abnormality of the high pressure pump is judged in accordance with the electric signal of fuel pressure regulation or the state of rising of the fuel pressure at the time of starting, the control is ready and can be accurately judged.

While the preferred embodiment of the present invention has been shown and described, it is to be understood that this disclosure is for the purpose of illustration and that various changes and modifications may be made without departing from the scope of the invention as set forth in the appended claims.

What is claimed is:

1. An abnormality warning system for a direct fuel injection engine having, a cylinder, a fuel injector mounted on said cylinder for injecting a fuel, a fuel feeder pump for supplying said fuel from a fuel tank to said injector via a fuel passage, a common rail provided between said fuel feeder pump and said fuel injector for distributing said fuel to said cylinder, a high pressure pump connected between said fuel feeder pump and said common rail for pressurizing said fuel, a high pressure regulator connected between said common rail and said fuel tank, an accelerator pedal sensor for detecting an opening degree of an accelerator pedal and for producing an accelerator signal, an engine speed sensor for sensing an engine speed and for generating an engine speed signal, a fuel pressure sensor mounted on said common rail for detecting a fuel pressure and for producing a pressure signal, and a control unit responsive to said accelerator, engine speed and pressure signals for controlling said fuel pressure, an improvement of the system which comprises:

desired fuel pressure setting means responsive to said accelerator and engine speed signals for calculating a desired fuel pressure and for generating a desired fuel pressure signal;

correcting means responsive to said pressure and desired fuel pressure signal for correcting an amount of said fuel to be injected and for producing a correcting current signal;

current control means responsive to said desired fuel pressure signal and said correcting current signal for calculating a current to control said high pressure regulator;

abnormality warning means responsive to said engine speed signal, said desired pressure signal and said correcting current signal for judging an abnormality of said high pressure pump due to correcting conditions of said fuel pressure signal and for producing an abnormality signal; and display means responsive to said abnormality signal for indicating a warning so as to prevent said direct fuel injection engine from damaging while operating.

2. The system according to the claim 1, further comprising:

allowable range setting means responsive to said engine speed signal and said desired pressure signal for deciding an allowable range of said current in dependency on said desired fuel pressure and for producing a threshold signal; and abnormality judging means responsive to said correcting current signal and said threshold signal for deciding whether said abnormality exists or not in said high pressure pump by comparing said correcting current signal with a maximum and a minimum value in accordance with said desired fuel pressure.

3. The system according to the claim 1, wherein said abnormality warning means decides said abnormality by detecting an increasing condition of said fuel pressure when starting said direct fuel injection engine.

* * * * *